United States Patent [19]
Malissin et al.

[11] 4,169,227
[45] Sep. 25, 1979

[54] SYSTEM FOR DETECTING THE TRACKING ERROR IN OPTICAL READERS AND RECORDERS

[75] Inventors: Roland Malissin; Daniel Lecomte; Claude Monlouis, all of Paris, France

[73] Assignee: Thomson-Brandt, Paris, France

[21] Appl. No.: 862,563

[22] Filed: Dec. 20, 1977

[30] Foreign Application Priority Data
Dec. 23, 1976 [FR] France .................................. 76 38894

[51] Int. Cl.² .................................................. G01J 1/20
[52] U.S. Cl. ....................................... 250/201; 358/128
[58] Field of Search ............... 250/201, 204, 209, 570; 358/128; 179/100.3 V

[56] References Cited
U.S. PATENT DOCUMENTS

| | | | |
|---|---|---|---|
| 4,063,287 | 12/1977 | Van Rosmalen | 250/202 |
| 4,064,539 | 12/1977 | Lewiner et al. | 358/128 |
| 4,074,312 | 2/1978 | Van Rosmalen | 179/100.3 V |

*Primary Examiner*—David C. Nelms
*Attorney, Agent, or Firm*—Cushman, Darby & Cushman

[57] ABSTRACT

The invention relates to the detection of the tracking error of a track using a process of periodic excursion of a reading beam in a direction which forms an angle with the direction of exploration of the track. The detection system comprises a mirror deflection by a bar vibrating in a flexural mode which is clamped to a base. Two plates of piezoelectric elements mechanically coupled with said vibrating bar are provided to excite the vibrating plate and to supply a reference signal in constant phase relation with the movement of the vibrating bar.

6 Claims, 9 Drawing Figures

SYSTEM FOR DETECTING THE TRACKING ERROR IN OPTICAL READERS AND RECORDERS

This invention relates to vibrating mirror deflection systems which are particularly intended to ensure the periodic excursion of a read-out beam in an optical reader or in a recorder comprising a supplementary beam for writing in the information.

During the recording of information along a track on a rotating support of the videodisc type or even during the reading of a previously recorded support, imperfections in centring or rotation necessitate the use of a tracking servomechanism so as to keep the reading spot in correct concordance with the track. In the case of a reader, the point in question is the focussing point on the support of the reading beam. In the case of a recording, the point in question is the focussing point on the support of a reading beam which is associated with the recording beam and which is particularly intended to following the arrangement of the track outlined by the recording beam.

It has been found that the sensitivity of the servocontrol loop to faults in optical alignment or to electronic variations is greatly reduced and the adjustment of the optical system simplified when the error signal ensuring radial tracking is obtained not by differential comparison of output signals of several photodetectors associated with one or more tracking beams focussed at one or more points of the support, but instead by the synchronous detection from a reference signal of frequency $f_o$ of an excursion frequency component modulated in amplitude at the frequency $f_o$. To this end, the reading spot is periodically subjected to an excursion at the frequency $f_o$ in a radial direction relative to the track. Thus, the same photodetector delivers a signal characterising the information stored in the track modulated in amplitude both by the non-concordance of tracking and by the periodic excursion at the frequency $f_o$. The periodic modulation detected reflects the degree of non-concordance of tracking and the phase detection gives an indication of the direction of the non-concordance of the reading spot relative to the track.

The periodic excursion of the reading beam is normally obtained by means of a deflecting element which is positioned in the path of the reading beam and which is capable of vibrating at a given frequency under the action of an external excitation so that the vibration produces a slight alternate deviation of the beam.

Various deflecting elements may be used. The tracking error signal acts on an element of the optical reading system which produces a displacement of the reading spot to maintain the concordance of tracking. This element is generally a pivoting mirror. In some cases, this mirror may be structured to vibrate in a natural vibratory mode which not only enables the tracking error to be corrected, but also produces the periodic deviation of the beam, the two movements being combined, the first being at low frequency and the second at very high frequency. The two operations of radial tracking and periodic excursion are thus obtained by a single element. Unfortunately, this process lacks flexibility because it implies by principle a limitation in the gain of the servocontrol loop on account of the resonance at very high frequency.

In another process, the deflecting element is formed by a refractive plate vibrating in a flexion mode of which the optical transmission properties vary with the stresses which it undergoes. The fixing of this element in the optical reading system produces a lowering of the Q factor as a result of undesirable mechanical couplings and, hence, a considerable reduction in the amplitude of vibration when it is compared with that of the non-fixed element.

The deflecting element of the system in accordance with the invention has such a structure that it may be rigidly fixed to the reader which provides for correct adjustments of alignment. It co-operates with the pivoting mirror which ensures correction of the radial tracking errors. It is a reflecting element so that only the reduced surface of the reflecting part has to be made with precision to avoid aberrations. Reflection also has the advantage over transmission that, for one and the same deviation of the deflector, the deviation of the light is distinctly greater. Accordingly, this element combines the advantages of conventional systems whilst obviating their disadvantages. Its sensitivity may be favourably compared with that of the devices mentioned above. The device according to the invention essentially comprises an elastic element vibrating in a flexural mode which is anchored on a substrate. Finally, electrical means are associated with this elastic element to make the excitation frequency coincide with the natural frequency of mechanical resonance so as to obtain maximum sensitivity and a constant phase relation between the excitation signal which also serves as reference for the synchronous detection and the movement producing the periodic excursion of the reading beam.

In accordance with the present invention, there is provided a system for detecting the tracking error of a beam of radiant energy following a track along a read out direction, said system comprising mirror deflection means for imparting to said beam a vibratory displacement intersecting said direction, excitation means causing said mirror deflection means to oscillate said beam at a frequency $f_o$ and detection means collecting said beam for supplying a signal representative of said tracking error; said mirror deflection means comprising a substrate, an elastic body having at least one flexible bar clamped at one end onto said substrate and a mirror carried by said bar for reflecting said beam; said mirror being supported by said bar at a position where rotational displacements are generated in response to a flexural mode of free vibrations occuring at said frequency $f_o$; said excitation means comprising a piezoelectric transducer element carried by said bar and coupled to an electrical oscillator circuit for freely setting up said flexural mode of free vibration.

For a better understanding of the present invention and to show how the same may be carried into effect, reference will be made to the ensuing description in conjunction with the accompanying drawings, among which:

Figure 1:
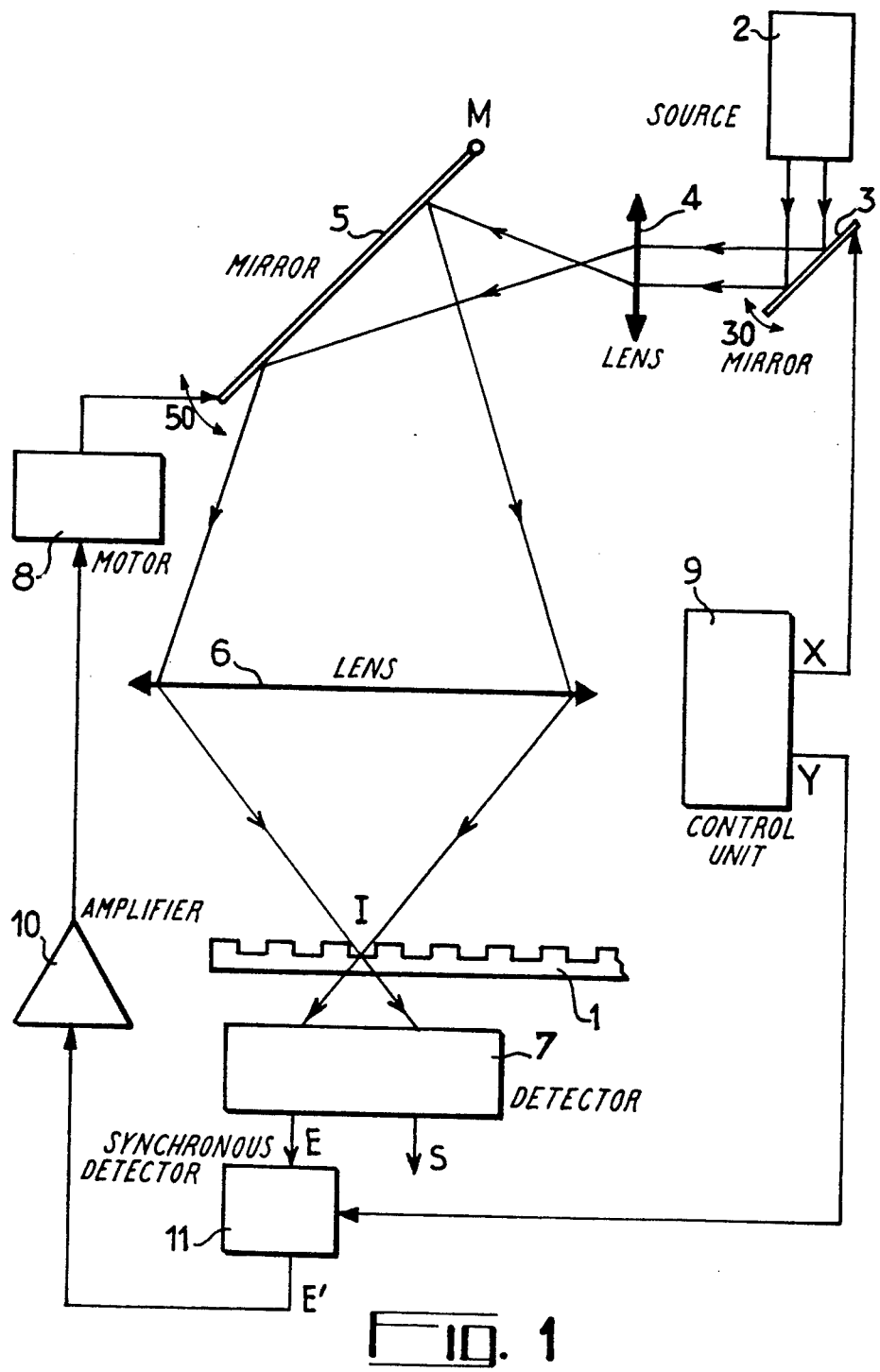
FIG. 1 shows an information carrier and an optical reader using the system in accordance with the invention.

FIG. 1 diagrammatically illustrates one example of embodiment of an optical reader intended for reading information previously recorded along a spiral track of a carrier formed by a transparent videodisc 1. The signal is recorded in the form of a string of micropits of uniform width distributed along the track. The periodic excursion process is particularly advantageous when the depth of the micropits enables a path difference equal to half the wavelength of the reading beam to be established in the material of the disc 1. The following description may also apply to a recorder formed by elements of which some are used for reading the track as it is outlined and, in particular, for ensuring radial tracking.

The disc 1 is read by means of a beam coming from a light source 2 which may be a helium-neon laser. The beam is directed and focussed onto the surface of the disc 1 at a point I by an optical system formed by a mirror 3, a convergent lens 4, a mirror 5 pivoting about a point M in the direction indicated by the arrow 50 and a lens 6. The precise construction of this optical system lends itself to numerous variants and only one of the possible variants has been described here.

It will be assumed that the disc is transmissive. The light beam transmitted by the disc 1 is collected by a reading device 7 which delivers, on the one hand, an output signal S representing the stored information (this signal is not essential in the case of a recorder) and, on the other hand, a signal E which is dependent upon the interval e between the reading spot I and the nearest turn.

The periodic excursion process necessitates the provision of a vibrating deflecting element. According to the invention, this element comprises a supporting member carrying mirror 3. When it is excited, it is capable of vibrating, causing the mirror to pivot periodically about a fixed point in a direction represented in the plane of the Fig. by the arrow 30. Thus, the signal E is an error signal modulated in amplitude to the frequency $f_o$. Electronic means 9 which will be defined hereinafter supply two voltages with the same frequency $f_o$, one of these voltages, X, serving to excite the deflector and the other voltage, Y, serving as reference to its synchronous detector 11 which extracts from the signal E an error signal E' of which the amplitude and polarity respectively characterise the degree and the direction of non-concordance of tracking. This error signal is applied by means of an amplifier 10 to a drive mechanism 8 which controls the pivoting of the mirror 5 about the point M and, hence, the displacement of the dot I in a radial direction relative to the track so as to correct the mistracking.

Figure 2:
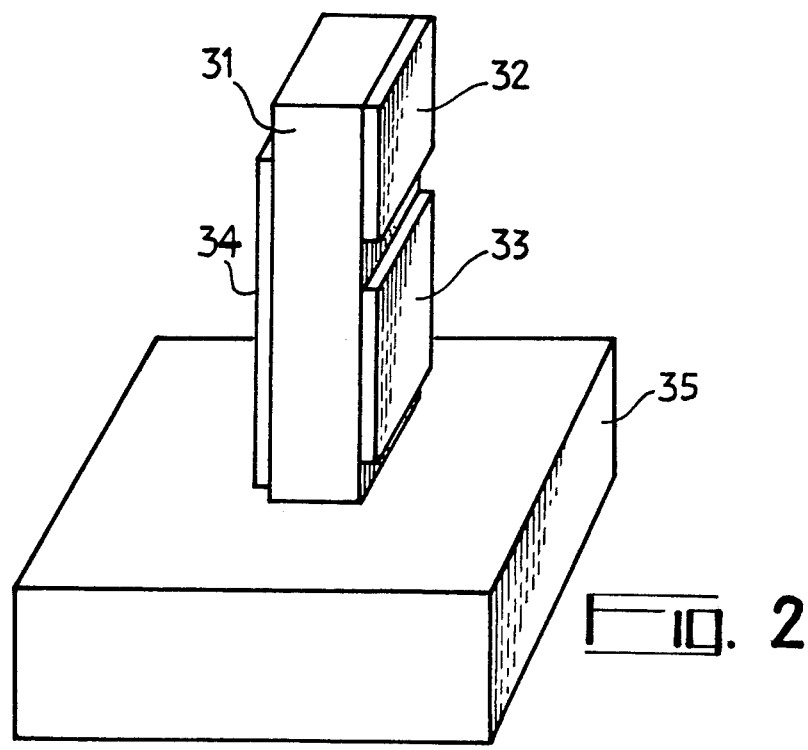
FIGS. 2 and 3 show the structure of the deflecting system according to the invention.

One embodiment of the deflector according to the invention is shown in FIG. 2. It is formed by a metallic bar 31 which is anchored in a substrate 25 and which vibrates in a flexural mode. The resonance frequency of the fundamental mode has to be very high in relation to the frequency band which it is desired to pass in the radial servocontrol which is of the order of 2 kc/s. This bar is excited at a frequency equal to the resonance frequency of the vibration mode selected by means of a ceramic piezoelectric plate 34 bonded to one lateral face of the bar 31. In order to obtain maximum sensitivity, it is preferable for the position of this plate to coincide with that region of the bar 31 where the strain is maximal for the mode selected. The light beam is intercepted by a mirror 32 which is also bonded to one face of the bar 31, preferably in the region where the angular deviation is greatest, generally to the free end of the bar 31. In many cases, it is desirable to obtain a signal which is in phase with the vibration of the plate. The signal may be the voltage collected by a second piezoelectric ceramic plate 33 bonded to the bar 31, for example on that face opposite the first piezoelectric plate 34. It would also be possible to collect the current flowing through the first piezoelectric plate 34.

Figure 3:
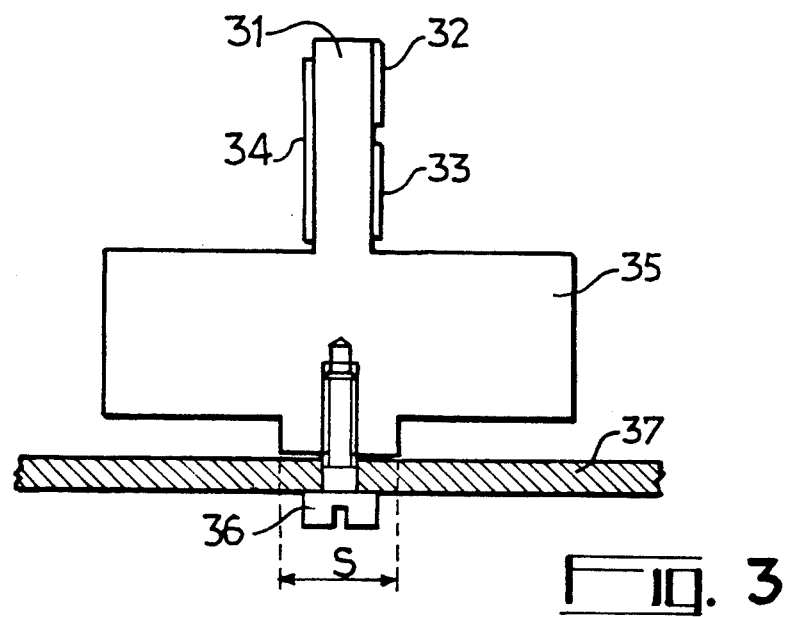

It is important for the resonance frequency of the bar 31 to be independent of the manner in which the support is fixed to the frame of the reader. On the other hand, fixing is required to be rigid. One way of satisfying these conditions is shown in FIG. 3 which is a section through the deflector. The support 35 of the bar is fixed to the frame of the reader 37 by means of a screw 36 so that the fixing surface S is small. Experience has shown that, in this way, the resonance frequency of the bar is invariable.

Figure 4A:
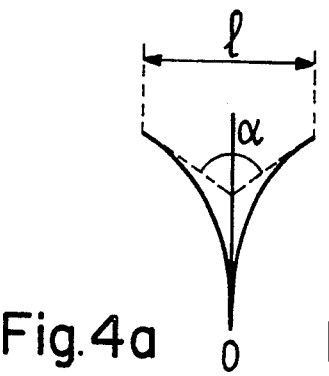
FIGS. 4a, 4b and 4c show various modes of operation of the flexing branch.
Figure 4B:
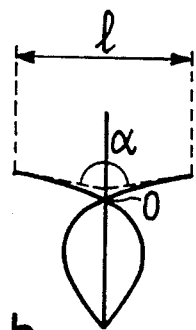
Figure 4C:
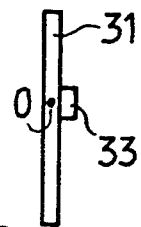

The choice of the mode used is dictated by the need for maximum sensitivity. FIGS. 4a, 4b and 4c show in highly exaggerated form the extreme positions and the mean position of the bar 31 in its flexion. The lowest mode of vibration is shown in FIG. 4a and the next mode in FIG. 4b. It can easily be verified that, for the same deflection of the end of the bar, a greater angular deviation is obtained and it is only this angular deviation which is useful for the deflection of the light beam where the second mode is used.

It will be assumed that the mirror is positioned at the end of the bar 31. The movement of this mirror is the result of two effects: an angular deviation $\alpha$ about a fixed point O which is the node of the vibration. This effect is the desired effect because it constitutes the pivoting in the direction 30. The second effect is a lateral displacement 1 which produces a parasitic displacement of the reading spot in the direction of the tracks. In practice, this parasitic displacement is generally not troublesome and may be disregarded. However, if it is desired to suppress this parasitic displacement, it is possible to position the mirror at a vibration node, as shown in the FIG. 4c.

The configuration described above is simple and effective. The vibrator fits readily into conventional optical readers because it replaces an element of the optical system. Numerous other configurations are of course possible. Various methods of anchoring may be contemplated. The shape of the vibrating member may vary. For example, it may comprise two arms like a tuning fork. It has also been seen that the positions of the piezoelectric plates and the mirror may vary without changing the principle of operation.

The simplest way of obtaining the signals X and Y would be to use a source delivering a signal of fixed frequency $f_o$ as close as possible to the mechanical resonance frequency $f_R$ of the mode selected. The signal, amplified and shaped, would supply the reference signal Y intended to synchronise the synchronous detector and the signal X for controlling the piezoelectric plate 34.

It is generally preferred to control the frequency $f_o$ by means of an oscillation loop and thus to eliminate the effects of any frequency drifts of the oscillator and the vibrating bar.

Figure 5:
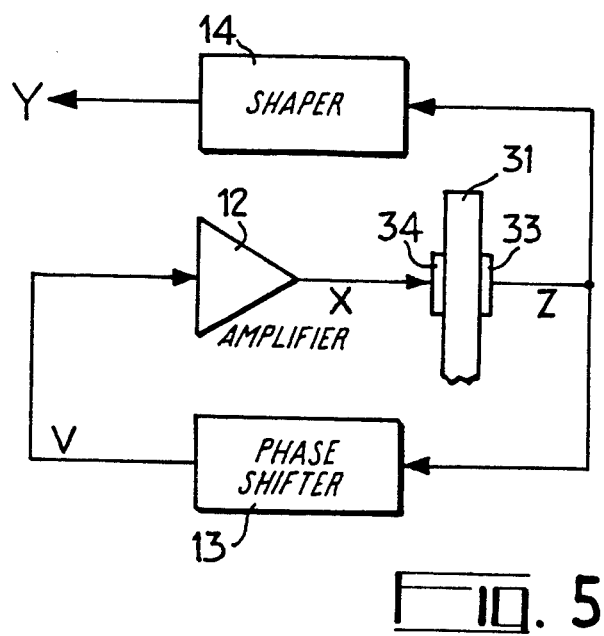
FIGS. 5, 6 and 7 are diagrams of several electronic means which can be associated with the deflector shown in FIGS. 2 and 3.

According to the diagram in FIG. 5, the electrical voltage Z coming from the piezoelectric plate 33 is phase shifted by a phase shifter 13. The signal V obtained is amplified by an amplifier 12 which supplies the signal X. The signal Z is shaped by the device 14 which supplies the signal Y. The loop oscillates at a frequency $f_o$ which depends upon the phase-frequency response of the bar 31. If $\phi_R$ is the phase corresponding to the frequency $f_R$, the condition of oscillation is that the sum of the phase shifts introduced by the elements of the loop other than the bar is equal to $2\pi - \phi_R$. The result is obtained by the adjustment of the phase shifter 13.

Figure 6:
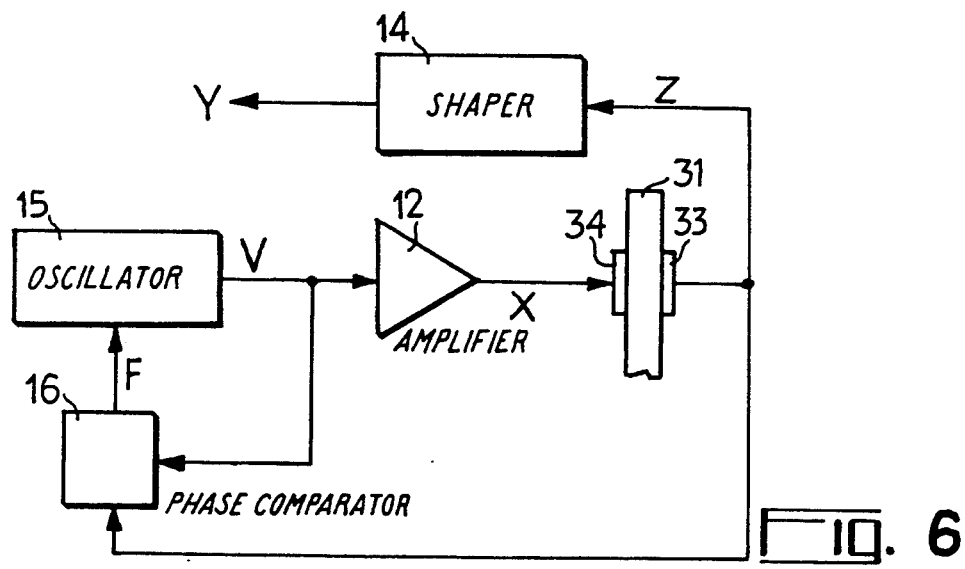

According to the diagram in FIG. 6, the signal V emanates from a voltage-controlled oscillator 15. The frequency $f_o$ of the signal V is controlled by a signal F coming from a phase comparator 16 which receives on the one hand the signal V and on the other hand the signal emitted by the piezoelectric plate 33.

The two loops described above give good results and the possible phase variations of the elements of the loop are generally negligible. The frequency $f_o$ is controlled to coincide narrowly with $f_R$ and does not vary to any significant extent.

Figure 7:
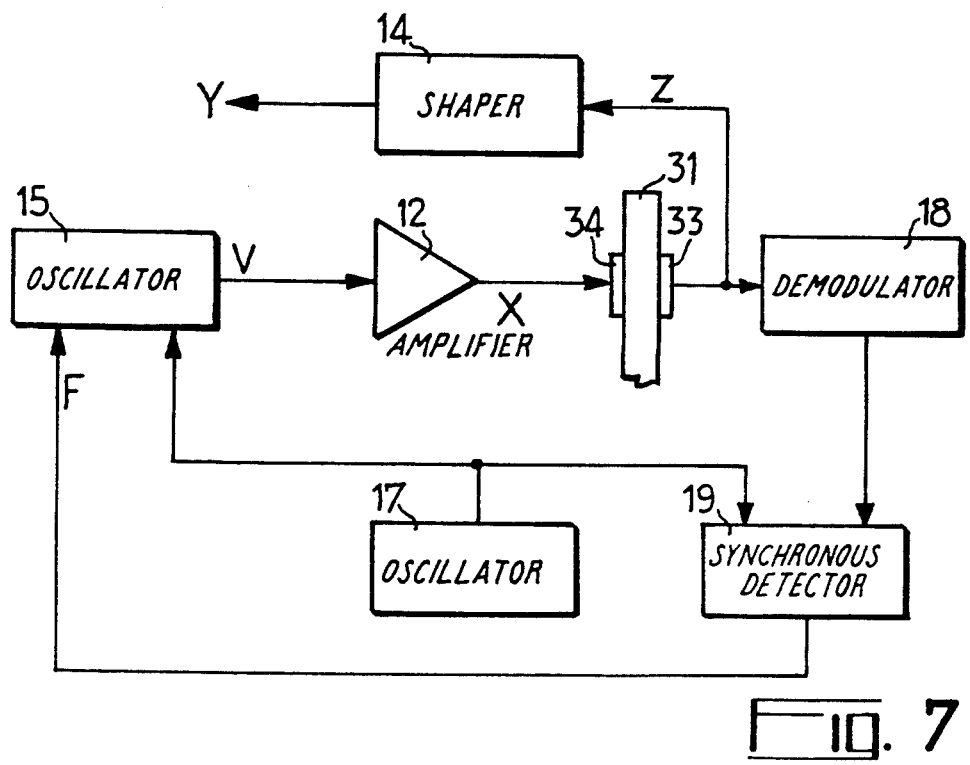

However, where it is desired to obtain a more perfect coincidence between $f_o$ and $f_R$, it would be possible to control the oscillation frequency in dependence upon the resonance frequency of the deflector. One example of embodiment is shown in FIG. 7.

The signal of frequency $f_o$ is frequency-modulated by a signal with a frequency $f_1$ lower than $f_o$ coming from an oscillator 17. The response curve of the deflector is thus explored and an amplitude modulation is superimposed upon the frequency modulation. A device 18 effects an envelope demodulation and the error signal F serving to adjust the mean frequency $f_o$ of the oscillator 15 emanates from the synchronous detection of the signal coming from the amplitude demodulator 18 by means of a synchronous detector synchronised by the frequency $f_1$.

Naturally, the preceding three diagrams have been given purely by way of example and do not preclude other embodiments of the electronic circuit to be associated with the deflector according to the invention.

What we claim is:

1. System for detecting the tracking error of a beam of radiant energy following a track along a read out direction, said system comprising mirror deflection means for imparting to said beam a vibratory displacement intersecting said direction, excitation means causing said mirror deflection means to oscillate said beam at a frequency $f_o$ and detection means collecting said beam for supplying a signal representative of said tracking error; said mirror deflection means comprising a substrate, an elastic body having at least one flexible bar having one free end and the other end clamped onto said substrate and a mirror carried by said bar for reflecting said beam; said mirror being supported by said bar at a position where rotational displacements are generated in response to a flexural mode of free vibrations occuring at said frequency $f_o$; said excitation means comprising a piezoelectric transducer element carried by said bar and coupled to an electrical oscillator circuit for setting up said flexural mode of free vibration.

2. System as claimed in claim 1, wherein said frequency $f_o$ is a frequency of free vibration for which said bar has a vibration node at said position.

3. System as claimed in claim 1, wherein said mirror is positioned at said free end.

4. System as claimed in claim 1, wherein a further piezoelectric element is positioned on said bar for delivering a reference electrical signal in phase with the flexural vibrations of said bar.

5. System as claimed in claim 1, wherein the information stored in said track is read out with a beam of radiant energy; the radiant energy emerging from the portion of said track illuminated by said beam being received by further detection means delivering a signal representative of said information.

6. System as claimed in claim 1, wherein the information stored in said track is written in with a further beam of radiant energy modulated by a signal representative of said information; said further beam being caused to accurately follow said track under the control of said tracking error.

* * * * *